US007715689B2

(12) United States Patent
Wakahara et al.

(10) Patent No.: US 7,715,689 B2
(45) Date of Patent: May 11, 2010

(54) BROADCAST RECEIVER AND SYSTEM FOR PERFORMING COPY PROHIBITION AND TIMED RECORDING

(75) Inventors: Tatsuya Wakahara, Tokyo (JP); Ichiro Hamada, Kanagawa (JP); Masao Mizutani, Kanagawa (JP); Hajime Inoue, Chiba (JP)

(73) Assignee: Sony Corporation (JP)

( * ) Notice: Subject to any disclaimer, the term of this patent is extended or adjusted under 35 U.S.C. 154(b) by 1099 days.

(21) Appl. No.: 11/371,275

(22) Filed: Mar. 8, 2006

(65) Prior Publication Data
US 2006/0153529 A1    Jul. 13, 2006

Related U.S. Application Data

(62) Division of application No. 09/622,722, filed as application No. PCT/JP99/07212 on Dec. 22, 1999, now Pat. No. 7,043,138.

(30) Foreign Application Priority Data
Dec. 22, 1998    (JP)    ............... P10-364786

(51) Int. Cl.
*H04N 5/91*    (2006.01)
*H04N 7/00*    (2006.01)
*H04N 7/26*    (2006.01)
*H04N 5/00*    (2006.01)

(52) U.S. Cl. .................. 386/94; 386/46; 386/124; 386/125; 386/126

(58) Field of Classification Search .............. 386/1, 386/46, 55, 68, 83, 94, 124–126
See application file for complete search history.

(56) References Cited

U.S. PATENT DOCUMENTS

| 6,208,799 | B1 * | 3/2001 | Marsh et al. ............... 386/83 |
| 6,223,285 | B1 | 4/2001 | Komuro et al. |
| 6,266,480 | B1 | 7/2001 | Ezaki et al. |
| 6,650,753 | B1 | 11/2003 | Lotspiech et al. |
| 6,701,062 | B1 | 3/2004 | Talstra et al. |
| 7,043,138 | B1 * | 5/2006 | Wakahara et al. ........... 386/83 |
| 2002/0172362 | A1 * | 11/2002 | Wonfor et al. ............ 380/201 |
| 2003/0126445 | A1 | 7/2003 | Wehrenberg |
| 2004/0073927 | A1 * | 4/2004 | Knudson et al. ............ 725/58 |

FOREIGN PATENT DOCUMENTS

| JP | 9-063443 | 3/1997 |
| JP | 10-040603 A | 2/1998 |
| JP | 10210412 | 8/1998 |
| JP | 10285522 | 10/1998 |

* cited by examiner

*Primary Examiner*—Marsha D Banks Harold
*Assistant Examiner*—Marc Dazenski
(74) *Attorney, Agent, or Firm*—Lerner, David, Littenberg, Krumholz & Mentlik, LLP

(57) ABSTRACT

A receiving system and a receiving device are provided for receiving and processing broadcast digital and analog signals such as video and audio programs. The system and device are capable of determining whether a received program is subject to copy prohibition. If the program is subject to copy prohibition, the system prevents copying of the program. The system and device are capable of performing timed recording of received programs, including checking the status of the device and/or the recording medium to determine whether timed recording is permitted. Timed recording may be permitted if a selected broadcast receiving device is a registered device.

14 Claims, 15 Drawing Sheets

Fig. 6A

DEVICE SETUP

| | | | |
|---|---|---|---|
| 72A | ☑ D-VHS1 | ABC | DVX-10000 |
| | ☑ D-VHS2 | DEF | |
| | ☑ D-VHS3 | GHI | DVX-10000 |
| | ☐ D-VHS | ABC | DVX-10000 |
| | ☐ D-VHS | DEF | |
| | ☑ MD1 | ABC | DVX-10000 |
| | ☑ MD2 | GHI | DVX-10000 |
| | ☐ MD | ABC | DVX-10000 |
| | ☐ PC | INOPERABLE | |

71 — ○ D-VHS1 / ○ D-VHS2 / ○ D-VHS3 / ○ MD1 / ○ MD2
73 — OK
74 — RETURN
72

Fig. 6B

DEVICE SETUP

| | | | |
|---|---|---|---|
| 75 | ☑ D-VHS1 | ABC | DVX-10000 |
| | ⊕ D-VHS2 | DEF | |
| | ☑ D-VHS3 | GHI | DVX-10000 |
| | ☐ D-VHS | ABC | DVX-10000 |
| | ☐ D-VHS | DEF | |
| | ☑ MD1 | ABC | DVX-10000 |
| | ☑ MD2 | GHI | DVX-10000 |
| | ☐ MD | ABC | DVX-10000 |
| | ☐ PC | INOPERABLE | |

71 — ○ D-VHS1 / ○ D-VHS2 / ○ D-VHS3 / ○ MD1 / ○ MD2
73 — OK
74 — RETURN
72

Fig. 7A

DEVICE SETUP

| | | |
|---|---|---|
| ☑ D-VHS1 | ABC | DVX-10000 |
| ☑ D-VHS2 | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC | INOPERABLE | |

71:
- ○ D-VHS1
- ○ D-VHS2
- ○ D-VHS3
- ○ MD1
- ○ MD2

73 — OK
74 — RETURN
72

Fig. 7B

DEVICE SETUP

| | | |
|---|---|---|
| ☑ D-VHS1 | ABC | DVX-10000 |
| ☐ D-VHS2 | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC | INOPERABLE | |

Fig. 7C

DEVICE SETUP

| | | |
|---|---|---|
| ☑ D-VHS1 | ABC | DVX-10000 |
| ☑ D-VHS2 | DEF | |
| ☐ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☑ MD3 | ABC | DVX-10000 |
| ☐ PC | INOPERABLE | |

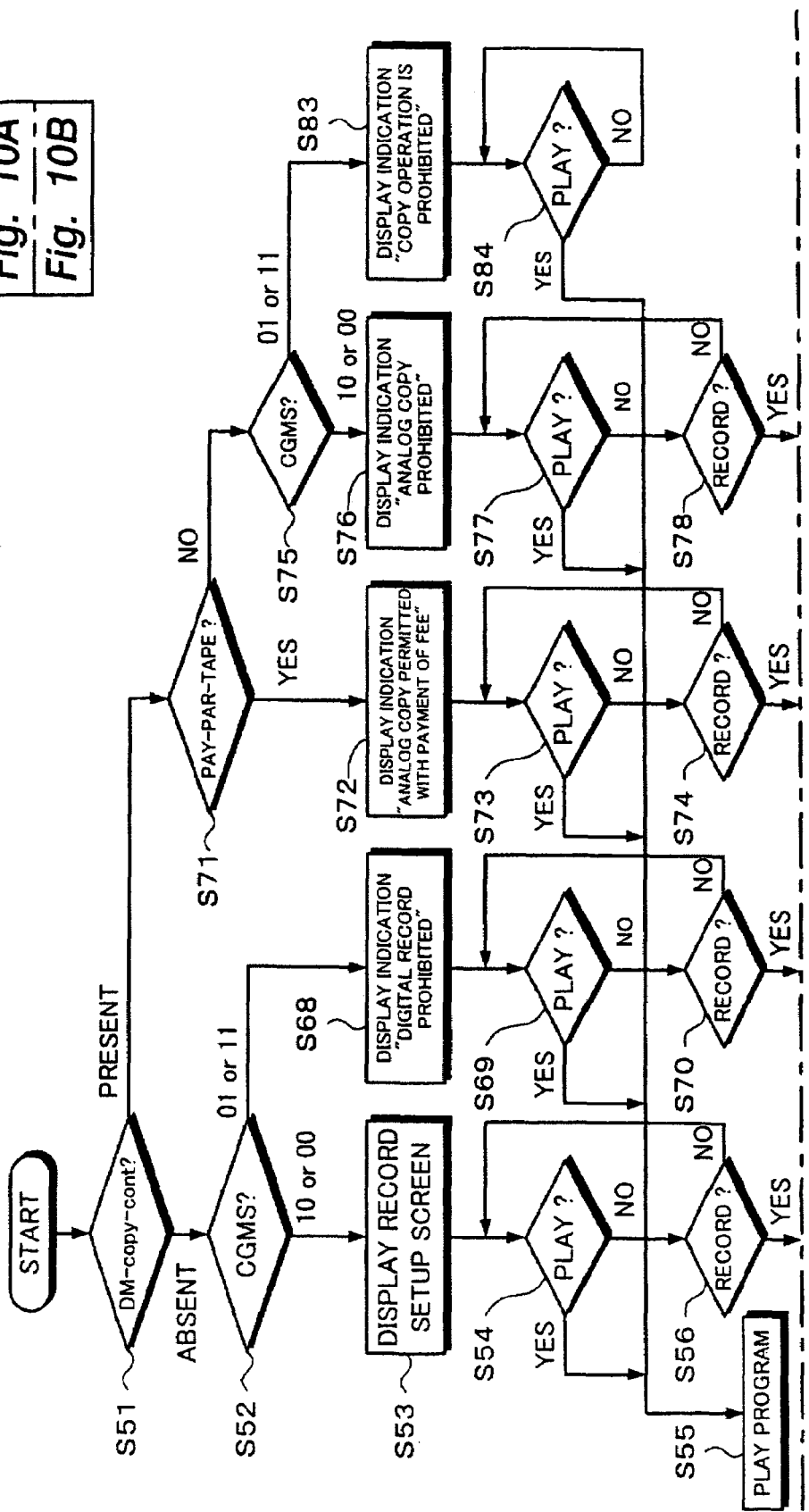

Fig. 11A
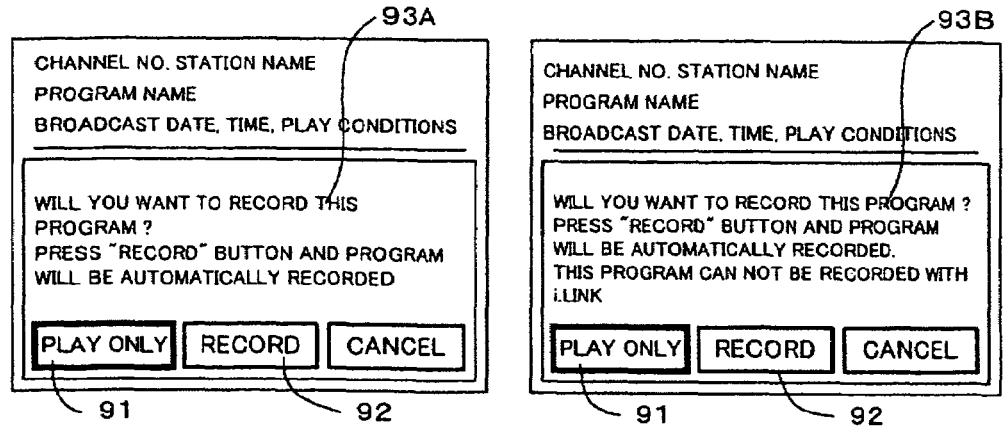
Fig. 11B
Fig. 11C
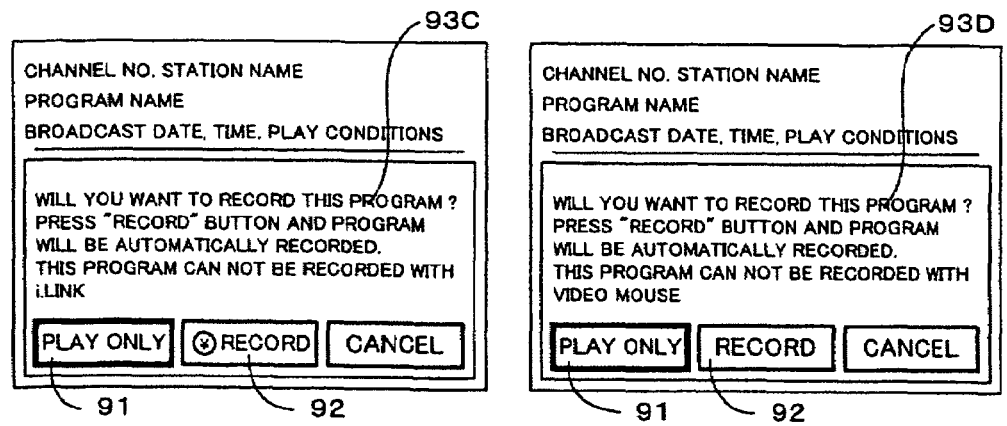
Fig. 11D
Fig. 11E
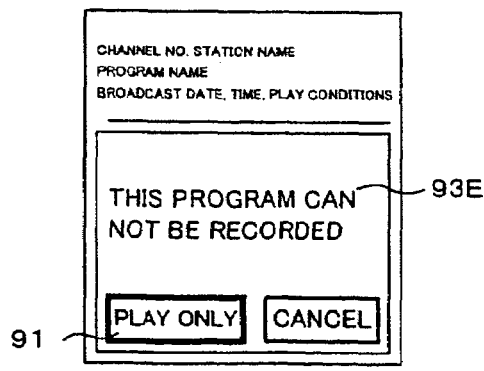

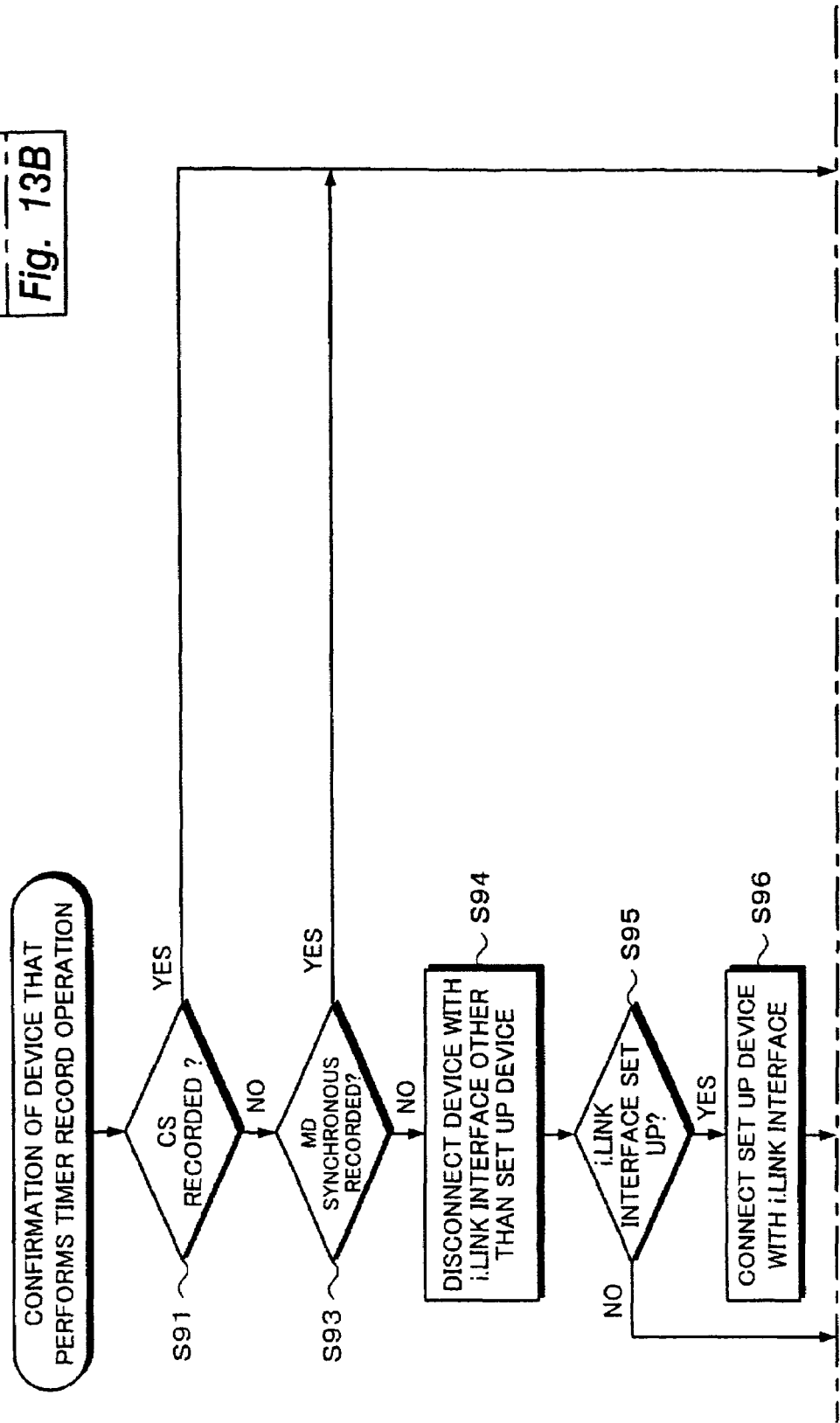

BROADCAST RECEIVER AND SYSTEM FOR PERFORMING COPY PROHIBITION AND TIMED RECORDING

CROSS-REFERENCE TO RELATED APPLICATIONS

The present application is a divisional of U.S. patent application Ser. No. 09/622,722, filed Sep. 28, 2000, which is the National Stage of International Application No. PCT/JP99/07212, filed Dec. 22, 1999, which claims the benefit of Japanese Application No. P10-364786, filed on Dec. 22, 1998, the entire disclosures of which are hereby incorporated herein by reference.

BACKGROUND OF INVENTION

1. Technical Field

The present invention relates to a digital broadcast receiving system for receiving an MPEG (Moving Picture Experts Group) 2 format broadcast transport stream of video data and audio data and transmitting the received stream to a digital signal processing device through an IEEE (Institute of Electrical Electronic Engineers) 1394 interface. The present invention also relates to a receiving device using such a system.

2. Related Art

In recent years, the IEEE 1394 interface that allows video data and audio data to be transferred between digital video devices and digital audio devices at high speed are becoming common. The IEEE 1394 interface supports both the isochronous transfer mode and the asynchronous transfer mode. The isochronous transfer mode is suitable for transferring a chronologically successive data stream of video data and audio data at high speed. On the other hand, the asynchronous transfer mode is suitable for transferring various commands.

Recently, digital broadcasts are becoming common. In a digital broadcast, a digital video signal and an audio signal are compressed corresponding to the MPEG2 format. In addition, a plurality of programs are multiplexed and transmitted. When a digital broadcast is received, an-IRD (Integrated Receiver Decoder) is connected to a television receiver. The IRD selects a signal of a program that the user desires and decodes the selected signal into a video signal and an audio signal. An output signal of the IRD is supplied to the television receiver.

A structure of which the IEEE 1394 interface is connected to the IRD that receives a digital broadcast has been proposed. When the IRD has the IEEE 1394 interface, the IRD is connected to a digital video recording/reproducing device through the IEEE 1394 interface. Thus, a digital broadcast receiving system can be structured.

As was described above, when the system of which the IRD is connected to the digital video recording/reproducing device through the IEEE 1394 interface is used, data can be easily transferred from the IRD to the digital video recording/reproducing device and recorded thereto.

In addition, the IEEE 1394 interface allows command to be transferred in addition to digital video data and digital audio data. Thus, a timer record operation can be easily performed. For example, when a program record start time is set up on the IRD side, at the program record start time, the IRD transfers a record start command to the digital video recording/reproducing device. Thus, the digital video recording/reproducing device enters the record mode and records data received from the IRD.

A program transmitted by a digital broadcast contains copyright information for protecting the copyright thereof. The copyright information is contained as two descriptors (DM_copy_control_descriptor) and (digital_copy_control_descriptor) in a PMT (Program Map Table) of a transport stream in such a manner that the copyright information of the service (program) is associated with the contents data.

The script (DM_copy_control_descriptor) contains information of an analog video output. On the other hand, the script (digital_copy_control_descriptor) contains information of CGMS (Copy Generation Management System) or M-CGMS( ) that is information of a digital video output.

Thus, in the digital broadcast receiving system of which the IRD is connected to the digital video recording/reproducing device through the IEEE 1394 interface, when a timer record operation is performed, it is necessary to notify the user whether or not a program that will be recorded with the timer record operation is copy-prohibited. In addition, in a digital broadcast, there are two prohibition modes that are a digital record prohibition mode and an analog record prohibition mode. Thus, it is necessary to notify the user whether or not a program is prohibited in the analog record prohibition mode or the digital record prohibition mode.

In addition, there are many adverse cases that when the timer record operation is performed, output data of the IRD is being recorded by another device; the digital video recording/reproducing device is operating; a tape or a disc is not loaded to the device or in record protect state. When the timer record operation is executed in such cases, data recorded on a tape may be destroyed. Alternatively, the device may malfunction. Thus, in such cases, it is desired to cancel the timer record operation and to notify the user of a cause of the cancellation of the timer record operation.

Therefore, an object of the present invention is to provide a digital broadcast receiving system and a receiving device that allow the timer record operation for a program to be prohibited so as to protect the copyright thereof.

Another object of the present invention is to provide a digital broadcast receiving system and a receiving device that cause the timer record operation to be canceled in the case that the timer record operation cannot be executed and allow the user to be notified of a cause of the cancellation of the timer record operation.

SUMMARY OF THE INVENTION

The present invention is a digital broadcast receiving system, comprising a digital broadcast receiving device for receiving a digital broadcast transmitted with a transport stream of which video data and audio data are compressed and decoding the received signal of the digital broadcast, and a plurality of digital signal processing devices for processing a digital signal, wherein said digital broadcast receiving device and said plurality of digital signal processing devices are connected through an interface and a digital signal is exchanged between said digital broadcast receiving device and said plurality of digital signal processing devices, and wherein said digital broadcast receiving device comprises a timer record operation setup means for setting up a timer record operation for a desired program, a copy prohibition determining means for determining whether or not a program to which the timer record operation has been set up is prohibited from being digitally copied, and a displaying means for displaying an indication that represents that a program that has been set up for the timer record operation cannot be digitally copied when the program is prohibited from being digitally copied.

The digital broadcast receiving system of the present invention further comprises an analog signal processing device for exchanging an analog signal with said plurality of digital broadcast receiving devices, wherein said digital broadcast receiving device further comprises an analog copy prohibition determining means for determining whether or not a program to which the timer record operation has been set up is prohibited from being analogously copied, and wherein when the program to which the timer record operation has been set up is prohibited from being analogously copied, said displaying means displays an indication that represents that said analog signal processing device cannot copy the program to which the timer record operation has been set up.

The present invention is a digital broadcast receiving system, comprising a digital broadcast receiving device for receiving a digital broadcast transmitted with a transport stream of which video data and audio data are compressed and decoding the received signal of the digital broadcast, and a plurality of digital signal processing devices for processing a digital signal, wherein said digital broadcast receiving device and said plurality of digital signal processing devices are connected through an interface and a digital signal is exchanged between said digital broadcast receiving device and said plurality of digital signal processing devices, and wherein said digital broadcast receiving device comprises a timer record operation setup means for setting up a timer record operation for a desired program, and a timer record operation execution controlling means for determining whether or not the program can be recorded and for canceling the timer record operation and issuing a message that represents that the timer record operation cannot be performed when the program cannot be recorded as the determined result.

When the timer record operation is performed, corresponding to information of (DM_copy_control_description) and information of CGMS or M-CGMS, it is determined whether the analog copy operation and the digital copy operation are prohibited or permitted. When the analog copy operation is prohibited, the analog timer record process is prohibited from being selected with the video mouse. When the digital copy operation is prohibited, the digital timer record process is prohibited from being performed with the IEEE 1394 interface. Thus, a program can be prevented from being illegally copied so as to protect the copyright thereof.

In addition, when the timer record operation is executed, after the timer record operation is confirmed, the state of the device that has set up the timer record operation is transmitted to the IRD 1 through the IEEE 1394 interface. Thus, while another device is recording a program, the MD synchronous record operation is being performed, a device that has set up the timer record operation is operating, a tape or a disc is not loaded to a device or in write protect state, a device is in analog record mode, or a smart file is a record prohibition portion, a relevant indication is displayed. In addition, the timer record operation is canceled.

BRIEF DESCRIPTION OF DRAWINGS

FIGS. 6A and 6B are schematic diagrams for explaining setup indications of the IRD of the digital satellite broadcast receiving system according to the present invention.

FIGS. 7A, 7B, and 7C are schematic diagrams for explaining setup indications of the IRD of the digital satellite broadcast receiving system according to the present invention.

FIGS. 10A and 10B are flow charts for explaining a timer record operation of the digital satellite broadcast receiving system according to the present invention.

FIGS. 11A, 118, 11C, 11D, and 11E are schematic diagrams for explaining the timer record operation of the digital satellite broadcast receiving system according to the present invention.

FIGS. 13A and 13B are flow charts for explaining the timer record operation of the digital satellite broadcast receiving system according to the present invention.

DETAILED DESCRIPTION

Figure 1:
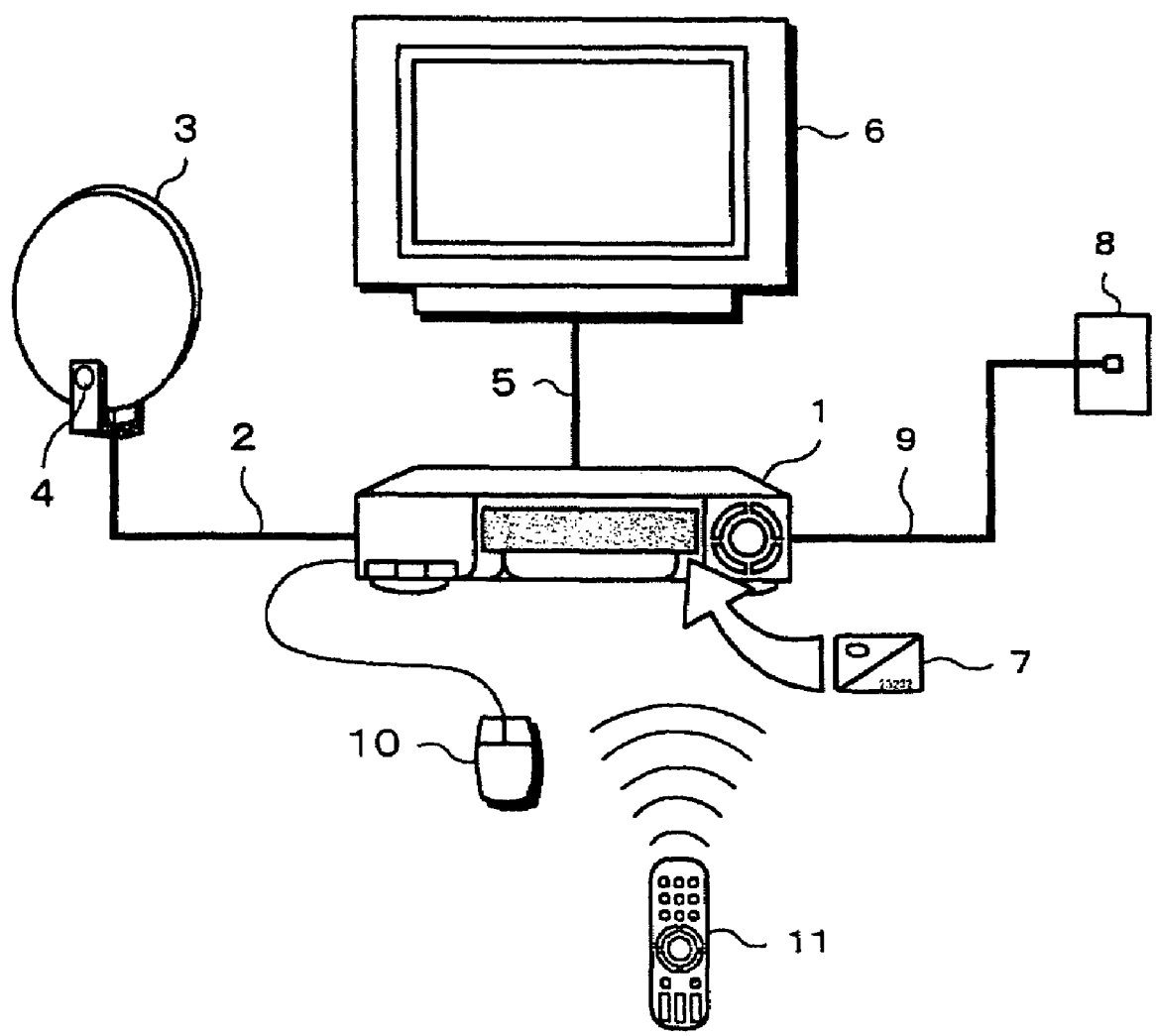
FIG. 1 is a schematic diagram showing an example of the structure of a digital satellite broadcast receiving system according to the present invention.

Next, with reference to the accompanying drawings, an embodiment of the present invention will be described. In FIG. 1, reference numeral 1 is an IRD. The IRD 1 decodes a received digital broadcast signal and forms a video signal and an audio signal corresponding to for example the NTSC format. An antenna terminal of the IRD 1 is connected to a low noise converter 4 through a cable 2. The low noise converter 4 is disposed on a parabola antenna 3. A radio wave of 12 GHz band is transmitted from a satellite. The radio wave transmitted from the satellite is received by the parabola antenna 3. The low noise converter 4 disposed on the parabola antenna 3 converts the radio wave into a signal of for example 1 GHz band.

The output signal of the low noise converter 4 is supplied to an antenna terminal of the IRD 1 through the cable 2. The IRD 1 selects a desired carrier signal from the received signal and demodulates the selected carrier signal into an MPEG2 format transport stream. The IRD 1 extracts video packets and audio packets of a desired program from the transport stream and decodes the extracted video packets and audio packets to a video signal and an audio signal corresponding to for example the NTSC format.

The video signal and the audio signal that are output from the IRD 1 are supplied to a television receiver 6 through a cable 5. The television receiver 6 displays pictures of the desired program and outputs sound in association therewith.

An IC card 7 is attached to the IRD 1. The IC card 7 stores charge information of pay-par-view programs. The IRD 1 is connected to a telephone line branch 8 through a cable 9. The charge information is transmitted from the IRD 1 through the telephone line.

The IRD 1 is operated with a remote controller 11. When infrared ray generating portions 10A and 10B are disposed, with the IRD 1, other devices (such as a VTR and an MD) can be controlled as will be described later.

Figure 2:
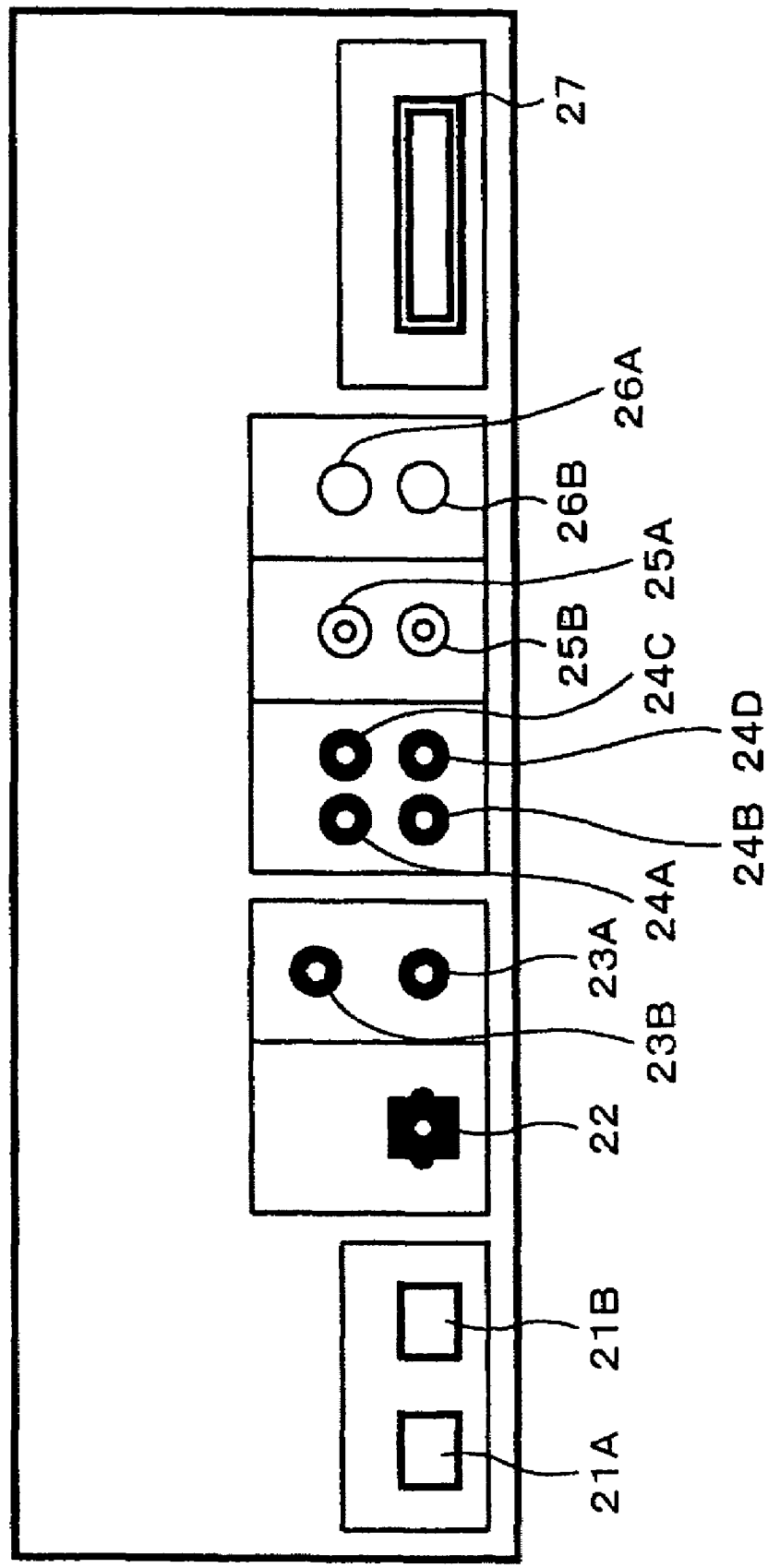
FIG. 2 is a rear view showing a rear panel of an IRD of the digital satellite broadcast receiving system according to the present invention.

As shown in FIG. 2, on the rear panel of the IRD 1, IEEE 1394 terminals 21A and 21B, an optical digital audio output terminal 22, control output terminals 23A and 23B, analog audio output terminals 24A, 245, 24C, and 24D, video output terminals 25A and 25B, S video output terminals 26A and 26B, and a high speed parallel output terminal 27 are disposed.

The IEEE 1394 terminals 21A and 21B are used to transfer data using the IEEE 1394 interface. As was described above, the IEEE 1394 interface supports both the isochronous transfer mode and the asynchronous transfer mode. The isochronous transfer mode assures a delay time of data transmission. Thus, the isochronous transfer mode is used to transfer a chronologically successive data stream such as video data and audio data at high speed. On the other hand, the asynchronous transfer mode is used to transfer data such as various commands.

The optical digital audio output terminal 22 is used to output a digital audio signal using an IEC 958 optical cable. The optical digital audio output terminal 22 is used to connect a digital audio device or the like that has an IEC 958 optical cable. The analog audio output terminals 24A to 24D are used to output analog audio signals. The video output terminals 25A and 25B and the S video output terminals 26A and 26B are used to output demodulated video signals.

Figure 3:
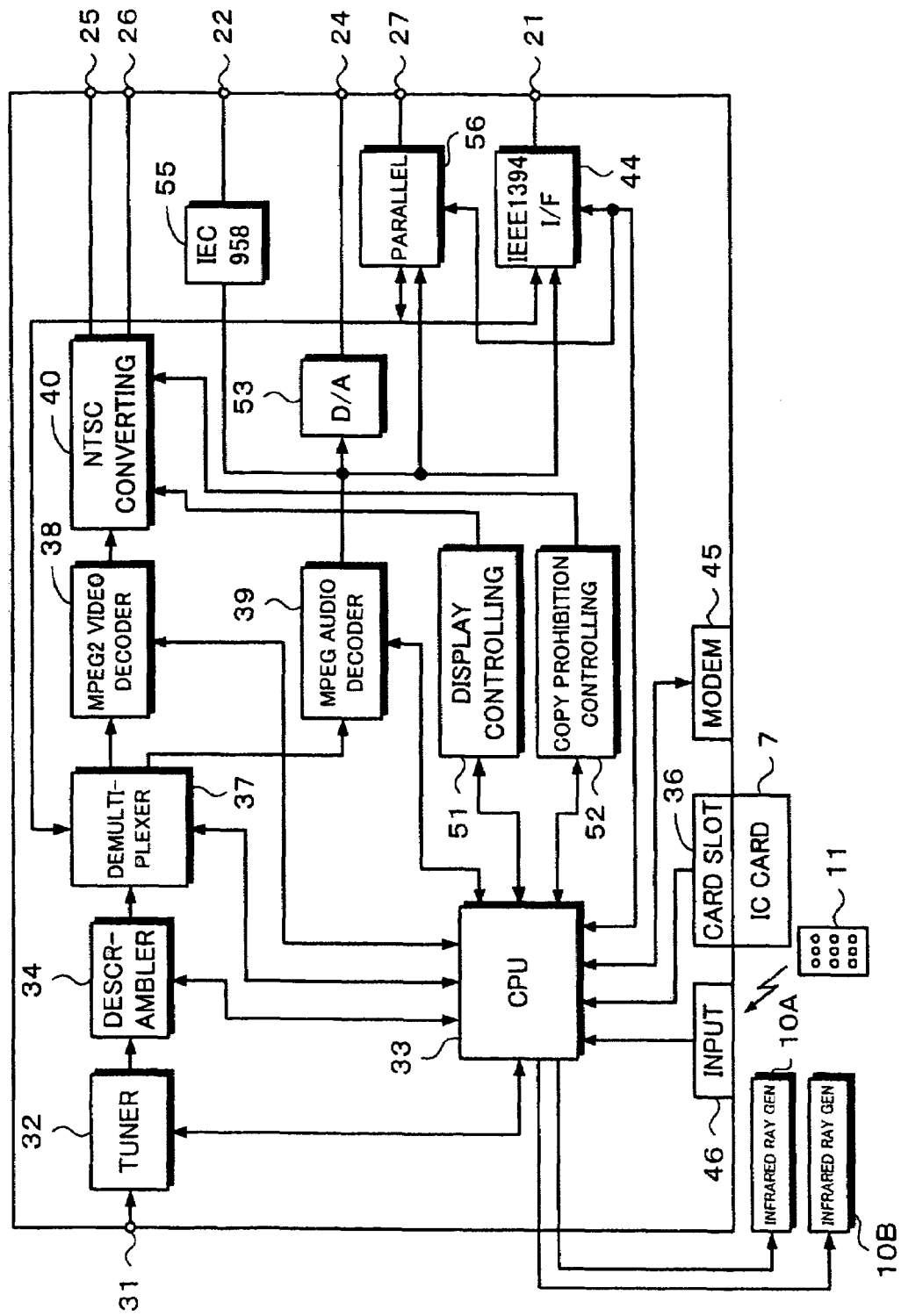
FIG. 3 is a block diagram showing the structure of the IRD of the digital satellite broadcast receiving system according to the present invention.

FIG. 3 shows the structure of the IRD 1. As shown in FIG. 1, a digital satellite broadcast radio wave of for example 12 GHz band transmitted through the satellite is received by the parabola antenna 3. The low noise converter 4 of the parabola antenna 3 converts the radio wave of 12 GHz band into a signal of 1 GHz band. An output signal of the low noise converter 4 is supplied to the antenna terminal 31 of the IRD 1 through the cable 2. A signal that is input from the antenna terminal 31 is supplied to a tuner circuit 32.

The tuner circuit 32 has a frequency selecting circuit, a demodulating circuit, and an error correction processing circuit. The frequency selecting circuit selects a predetermined carrier frequency signal from the received signal. The demodulating circuit performs the QPSK (Quadrature Phase Shift Keying) demodulating process. The tuner circuit 32 selects a desired carrier frequency signal from the received signal corresponding to a setup signal received from a CPU (Central Processing Unit) 33 that controls all portions of the IRD 1. The tuner circuit 32 demodulates the received signal corresponding to the QPSK (Quadrature Phase Shift Keying) demodulating method and performs an error correcting process for the demodulated signal.

An output signal of the tuner circuit 32 is supplied to a descrambler 34. Received ECM (Entitlement Control Message) data and EMM (Entitlement Management Message) data are supplied to the descrambler 34. In addition, descrambling key data stored in the IC card 7 attached to an IC card slot 36 is supplied to the descrambler 34. With the received ECM data and EMM data and the key data stored in the IC card 7, the descrambler 34 descrambles the MPEG transport stream. The descrambled MPEG2 transport stream is supplied to a demultiplexer 37.

The demultiplexer 37 demultiplexes desired packets from the stream that is output from the descrambler 34 corresponding to a command received from the CPU 33. A header portion of each transmission packet contains a packet identifier (PID). The demultiplexer 37 extracts video packets and audio packets of a desired program from the steam corresponding to the PID. The extracted video packets of the desired program are supplied to an MPEG2 video decoder 38. The extracted audio packets of the desired program are supplied to an MPEG audio decoder 39.

The MPEG2 video decoder 38 receives the packets of the video signal from the demultiplexer 37, decodes the packets corresponding to the MPEG2 format, and forms video data. The video data is supplied to an NTSC converting circuit 40. The NTSC converting circuit 40 converts video data that has been decoded by the MPEG video decoder 38 into a video signal corresponding to the NTSC format.

Output signals of a display controlling circuit 51 and a copy prohibition controlling circuit 52 are supplied to the NTSC converting circuit 40. The display controlling circuit 51 generates various types of screens displayed on the television receiver. When necessary, the copy prohibition controlling circuit 52 generates a copy prohibition control signal so as to protect the copyright of video data.

An output signal of the NTSC converting circuit 40 is supplied to an analog video output terminal 25 and an S video output terminal 26. The analog video output terminal 25 outputs an analog composite video signal corresponding to the NTSC format. The S video output terminal 26 outputs an S video signal (component video signal).

The MPEG audio decoder 39 receives the audio packets from the demultiplexer 37, performs an audio decoding process corresponding to the MPEG format for the audio packets, and generates decompressed audio data. The decoded audio data is output from a digital audio output terminal 22 through an IEC 958 interface circuit 55. In addition, a D/A converter 53 converts the digital audio signal into an analog audio signal. The analog audio signal is supplied to an analog audio output terminal 24.

An input signal of the IRD 1 is supplied from an input portion 46. The input portion 46 is composed of a light receiving portion and an operation panel of the remote controller 11. In addition, the IRD 1 has a modem 45. With the modem 45, charge information is transmitted through the telephone line. Moreover, an infrared ray generating portion 10 is connected to the CPU 33.

A carrier frequency of the received signal is selected corresponding to a channel selection signal that is input through the remote controller 11. The channel selection signal is input by the user. When a desired program is selected, a reception frequency of the tuner circuit 32 is set to a predetermined carrier frequency with reference to the NIT (Network Information Table). With reference to the PAT (Program Association Table) containing information representing the relation between carrier frequencies and channels, the PID of the PMT (Program Map Table) containing information of a desired channel can be obtained. By extracting packets having the obtained PID, the PIDs of packets of video data, audio data, and additional data of the desired channel can be obtained.

In addition, the IRD 1 has an IEEE 1394 interface 44. A transport stream can be input and output between the demultiplexer 37 and the IEEE 1394 interface 44. An output of the MPEG audio decoder 39 is connected to the IEEE 1394 interface. Thus, PCM audio data can be output to an external device.

The IRD 1 also has a high speed parallel interface 56. A transport stream can be input and output through the high speed parallel data interface 56. In addition, PCM audio data can be output through the high speed parallel data interface 56.

Figure 4:
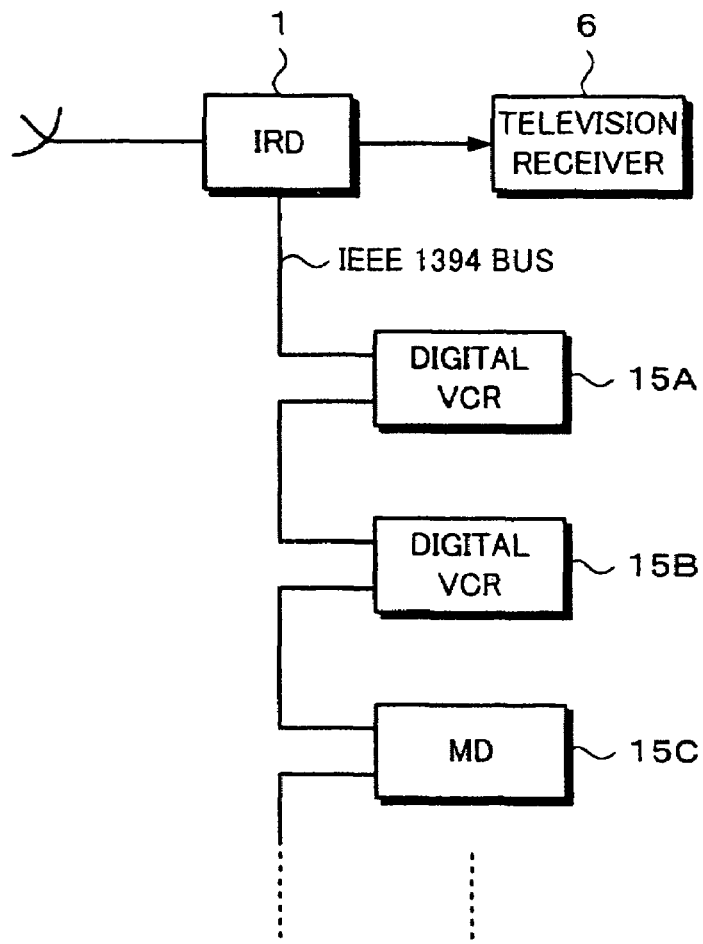
FIG. 4 is a block diagram for explaining the digital satellite broadcast receiving system according to the present invention.

As was described above, the IRD 1 has the IEEE 1394 interface 44. With the IEEE 1394 interface 44, as shown in FIG. 4, other digital devices 15A, 15B, 15C, and so forth (for example, digital video recording/reproducing devices and MD (mini disc) recording/reproducing devices) are connected to the IRD 1.

The IEEE 1394 standard allows node ID numbers "0" to "63" to be assigned. The last node number "63" is assigned to a broadcast connecting device. A node ID number is automatically assigned when a device is connected to the IEEE 1394 bus. Information of up to five devices that are connected through the bus can be registered to the IRD 1. The node number and device information (for example, device type, manufacturer name, model name, and cable connection state) of each device connected to the IRD 1 are stored to a non-volatile memory (not shown) connected to the CPU 33.

Figure 5:
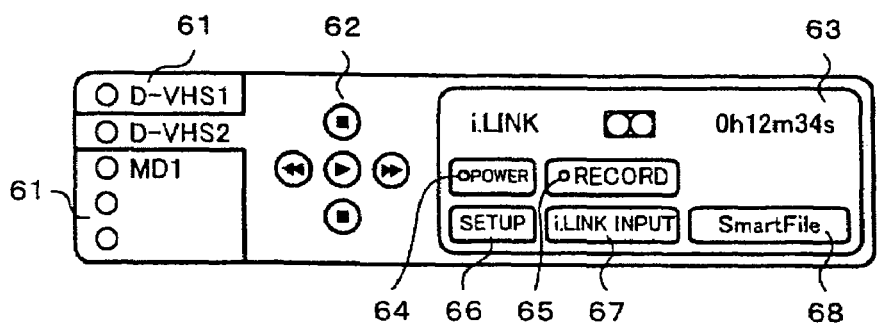
FIG. 5 is a schematic diagram for explaining indications of the control panel of the IRD of the digital satellite broadcast receiving system according to the present invention.

A registered device can be changed on a setup change screen that is evoked with a setup button 66 on the control panel of the IRD 1 as shown in FIG. 5. The control panel has a device selection indication portion 61, a function button indication portion 62, a state indication portion 63, a power button 64, a record button 65, a setup button 66, an IEEE 1394 input selection button 67 (represented as i.LINK in FIG. 5), and a smart file execution button 68. The smart file represents the name of a function of a memory disposed in a tape cassette loaded to a digital VTR. The memory stores information of the contents recorded on the tape cassette. The device selection indication portion 61 represents up to five registered device names. When the IEEE 1394 input selection button 67 is pressed, a desired device can be selected from the registered devices.

When the setup button 66 on the control panel is pressed, the setup change screen as shown in FIG. 6 is displayed.

As shown in FIG. 6A, the setup change screen has a registered device indication portion 71, a connected device indication portion 72, an OK button 73, and a return button 74. The connected device indication portion 72 has a device type field (as a left column), a manufacturer name field (as a middle column), and a model name field (as a right column).

The registered device indication portion 71 represents names of up to five registered device. In the registered device indication portion 71, a highlighted indication represents a device that is physically connected to the bus. When the IEEE 1394 interface cable of a registered device is disconnected from the IRD 1, the highlighted indication becomes dim. When a registered device is connected to the IRD 1 with the IEEE 1394 interface cable, the indication of the registered name becomes bright (highlighted).

When devices are connected to the IRD 1 with respective IEEE 1394 interface cables, up to five devices are automatically registered. Thus, when five devices have been registered, even if a sixth device is connected, it is not registered.

When a device connected to the IRD 1 with an IEEE 1394 interface cable is registered, a check column 72A for the registered device is checked with a check mark. By changing check marks of devices, the registration states of the devices can be changed. A check mark of a device that has set up the timer record operation and a check mark of a device that is exchanging a signal cannot be changed. In other words, when the registration states of a device that has set up the timer record operation and a device that exchanging a signal are changed, the timer record operation may not be correctly performed and data may not be correctly transmitted.

In addition, as shown in FIG. 6B, a device that has set up the timer record operation is represented with for example a reserve (clock) mark 75. For a device with the reserve mark 75, the check mark cannot be removed from the check column 72A.

FIG. 7 shows a process for changing the registration state of a device that has been registered. For example, a device of D-VHS2 is changed to a device of MD3. As shown in FIG. 7A, the cursor is moved to the position of the device of D-VHS2. Thereafter, the OK button 73 is pressed. When the OK button 73 is pressed at the position, as shown in FIG. 7B, the check mark of D-VHS2 is removed. Thereafter, the cursor is moved to the position at which a device is newly registered. At this position, the OK button 73 is pressed. Thus, as shown in FIG. 7C, a check mark is added at the position of MD3. By changing a check mark and pressing the OK, button and the return button, a device checked with a check mark is newly registered.

Figure 8A:
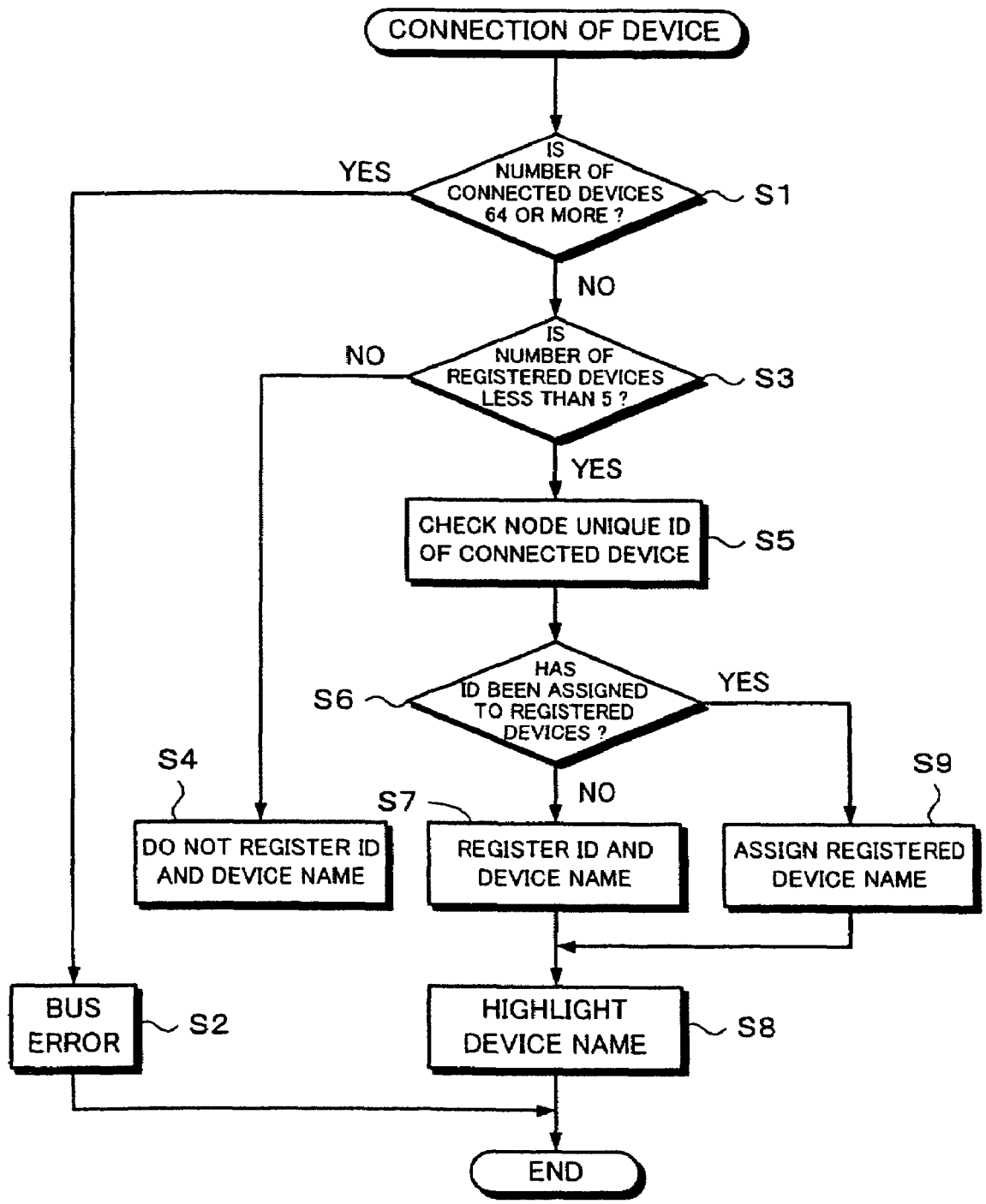
FIGS. 8A and 8B are flow charts for explaining the registration of a device of the digital satellite broadcast receiving system according to the present invention.

FIG. 8 is a flow chart showing such a process (namely, an automatic device registering process). As shown in FIG. 8A, when a device is connected, it is determined whether or not the number of connected devices is 64 or more (at step S1). When the determined result at step S1 is Yes (namely, the number of connected devices is 64 or more), a bus error takes place (at step S2). At step S2, an error process is performed and then the flow exits from the process. On the other hand, when the determined result at step S1 is No (namely, the number of connected devices is less than 64), it is determined whether or not the number of registered devices is less than 5 (at step S3). When the determined result at step S3 is No (namely, the number of registered devices is not less than 5), the flow exits from the process without registering the node ID number and the device name (at step S3).

When the determined result at step S3 is Yes (namely, the number of registered devices is less than 5), the node ID number of the device connected to the bus is checked (at step S5). Thereafter, it is determined whether or not the ID number of the device has been used for registered devices (at step S6).

When the determined result at step S6 is No (namely, the ID number of the connected device has not been used), the ID number and the device name are newly registered (at step S7). Thereafter, the device name is highlighted (at step S8).

When the determined result at step S6 is Yes (namely, the ID number of the connected device has been used), the device name of the ID number that has been registered is assigned (at step S9). Thereafter, the device name is highlighted (at step S8).

Figure 8B:
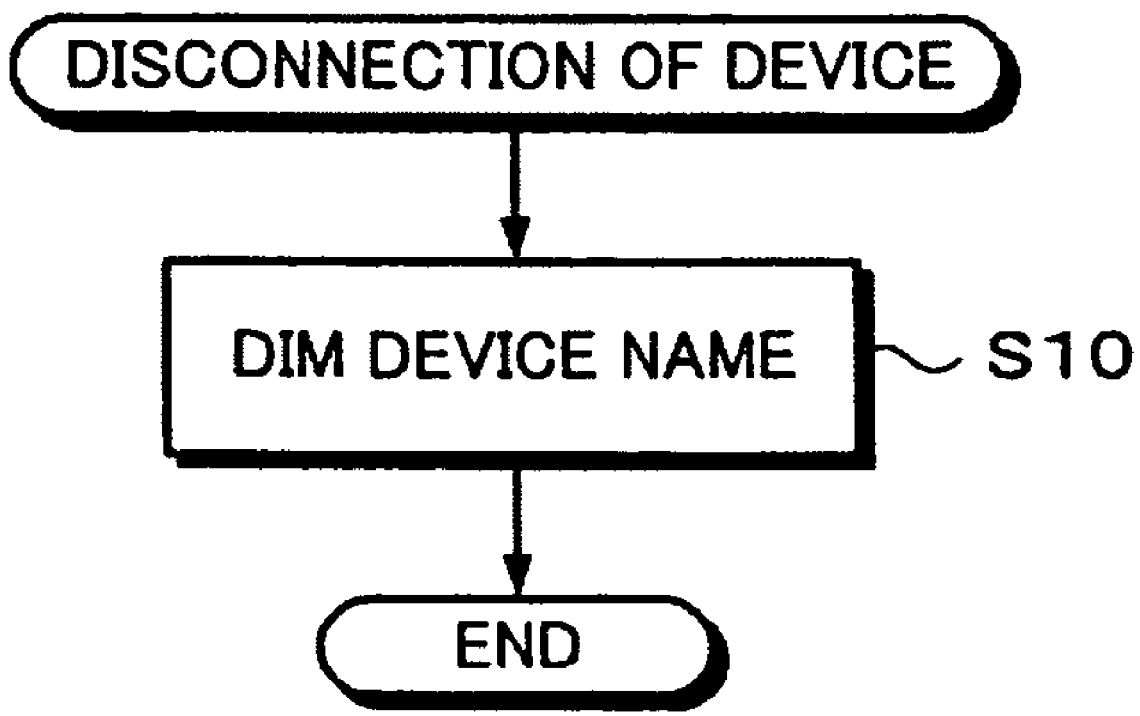

As shown in FIG. 8B, when a connected device is disconnected, the device name becomes dim (at step S10).

Figure 9:
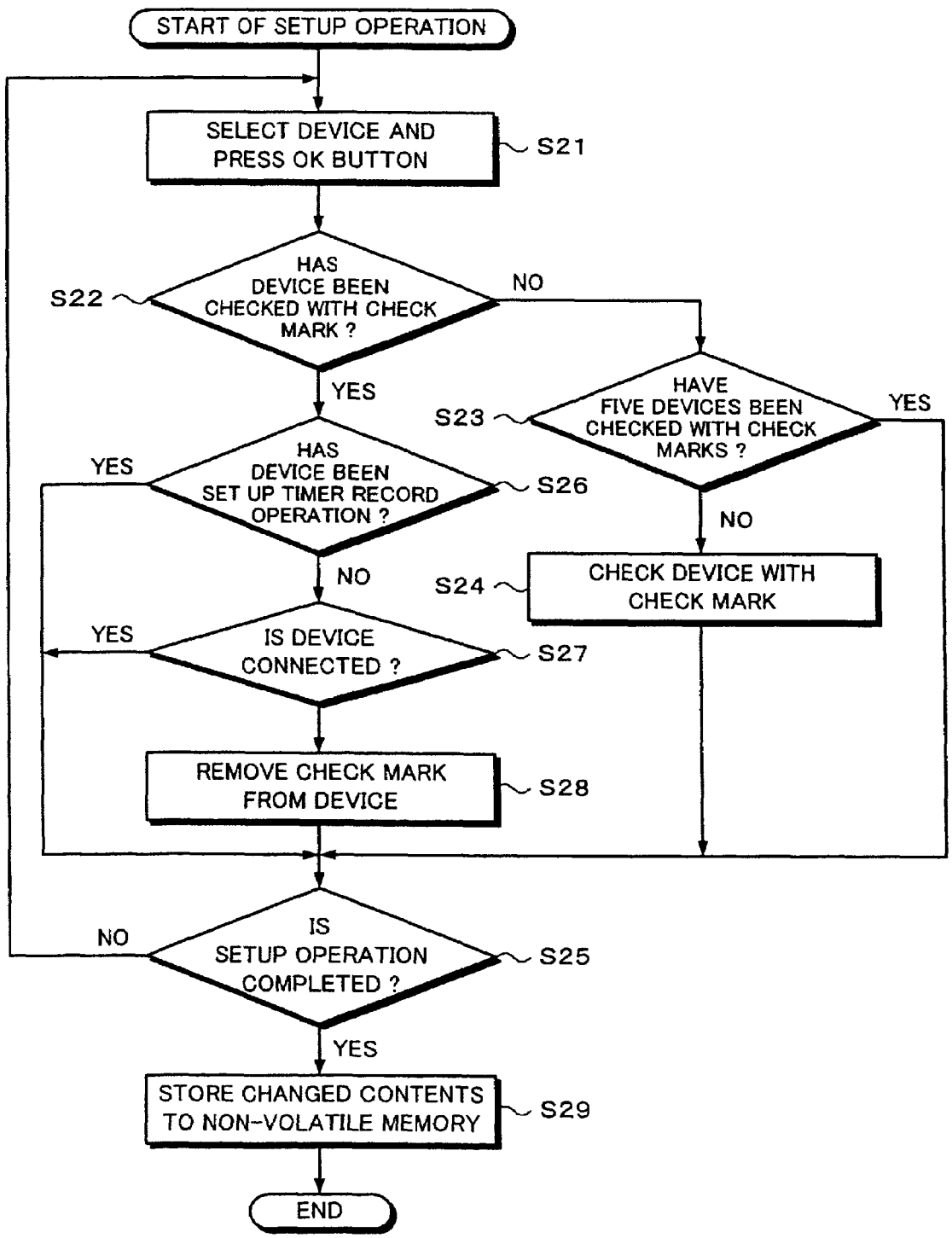
FIG. 9 is a flow chart for explaining the registration of a device of the digital satellite broadcast receiving system according to the present invention.

FIG. 9 is a flow chart showing a process for changing a registered device. In FIG. 9, when a device is selected and then the OK button 73 is pressed (at step S21), it is determined whether or not the device has been checked with a check mark (at step S22).

When the determined result at step S22 is No (namely, the device has not been checked with a check mark), it is determined whether or not five devices have been checked with check marks (at step S23). When the determined result at step S23 is No (namely, five devices have not been checked with check marks), the device is checked with a check mark (at step S24). Thereafter, it is determined whether or not the setup operation is completed (at step S25). When the determined result at step S25 is No (namely, the setup operation is not completed), the flow returns to step S21.

When the determined result at step S23 is Yes (namely, five devices have been checked with check marks), a check mark is not changed. Thereafter, the flow advances to step S25. At step S25, it is determined whether or not the setup operation is completed. When the determined result at step S25 is No (namely, the setup operation is not completed), the flow returns to step S21.

When the determined result at step S22 is Yes (namely, the selected device has been checked with a check mark), it is determined whether or not the selected device has set up the timer record operation (at step S26). Since the registration state of the device that has set up the timer record operation cannot be removed, the check mark of the device that has set up the timer record operation is not changed. Thereafter, the flow advances to step S25. At step S25, it is determined whether or not the setup operation is completed. When the determined result at step S25 is No (namely, the setup operation is not completed), the flow returns to step S21.

When the determined result at step S26 is No (namely, the device has not set up the timer record operation), it is determined whether or not the device is connected (namely, signals are actually being transmitted and received) (at step S27). Since a check mark cannot be removed from a device that is connected, the check mark is not changed. Thereafter, the flow advances to step S25. At step S25, it is determined whether or not the setup operation is completed. When the determined result at step S25 is No (namely, the setup operation is not completed), the flow returns to step S21.

When the determined result at step S27 is No (namely, the device is not connected), a check mark of the device is removed (at step S28). Thereafter, the flow advances to step S25. At step S25, it is determined whether or not the setup operation is completed. When the determined result at step S25 is No (namely, the setup operation is not completed), the flow returns to step S21.

When the return button 74 is pressed at step S25, the setup operation is completed. Thereafter, the changed contents are written to the non-volatile memory (not shown) connected to the CPU 33 (at step S29). Thereafter, the flow exits from the process and the control panel is displayed.

Next, the timer record operation of the satellite broadcast receiving system will be described.

When a program (that is a TV program having video data and audio data or a radio program having only audio data) received by the IRD 1 is recorded, it may be analogously recorded with an analog video tape recording/reproducing device or an MD recording/reproducing device connected to the analog audio output terminals 24A to 24D and the video output terminals 25A and 25B. Alternatively, the received program may be digitally recorded with a digital video tape recording/reproducing device or an MD recording/reproducing device connected to the IEEE 1394 terminals 21A and 21B. As a further alternative method, the received program may be digitally recorded with an MD recording/reproducing device connected to the digital audio output terminal 22. When a received program is digitally recorded, a device that performs the timer record operation can be designated using the IEEE 1394 interface. When a received program is analogously recorded, the timer record operation can be controlled with the infrared ray generating portion 10A (referred to as video mouse) and the infrared ray generating portion 10B (referred to as MD mouse).

A program transmitted as a digital satellite broadcast contains copyright information for preventing the copyright thereof from being infringed due to an illegal copy. The copyright information is contained as two descriptors (DM_copy_control_descriptor) and (digital_copy_control_descriptor) in the PMT (Program Map Table) of a transport stream.

The descriptor (DM_copy_control_descriptor) contains information of an analog video output, trigger information of analog video guard, and pay-par-tape information. When the user records a pay-par-tape program to a tape, with a declaration and a payment of an extra fee, the analog copy guard is removed from the program. Otherwise, the analog copy guard is not removed from the program.

The descriptor (digital_copy_control_descriptor) contains information of CGMS or M-CGMS. Corresponding to the information, a digital output is controlled.

Each of CGMS and M-CGMS is two-bit copyright information that represents:
"00" (used with both CGMS and M-CGMS): copy enable (copy free).
"01" (used with only M-CGMS): no more copy
"10" (used with both CGMS and M-CGMS): copy once. (in M-CGMS) copy-one-generation
"11" (used with both CGMS and M-CGMS): copy never FIG. 10 is a flow chart showing a record setup process. As shown in FIG. 10, corresponding to the descriptor (DM_copy_control_descriptor), it is determined whether or not the analog copy operation is prohibited (at step S51).

When the determined result at step S51 is No (namely, the analog copy operation is not prohibited), it is determined whether the CGMS is "10", "00", "01", or "11" (at step S52). When the CGMS is "10" or "00" as the determined result at step S52, the digital copy operation is permitted.

Thereafter, as shown in FIG. 11A, a program play/record setup screen is displayed (at step S53). At this point, the analog copy operation is permitted as the determined result at step S51. In addition, the digital copy operation is permitted as the determined result at step S52. Thus, since both the analog copy operation and the digital copy operations are permitted, an indication "The record operation will be automatically started." 93A is displayed.

When a play button 91 is pressed (at step S54), the play process for the designated program is performed (at step S55).

Figure 10B:
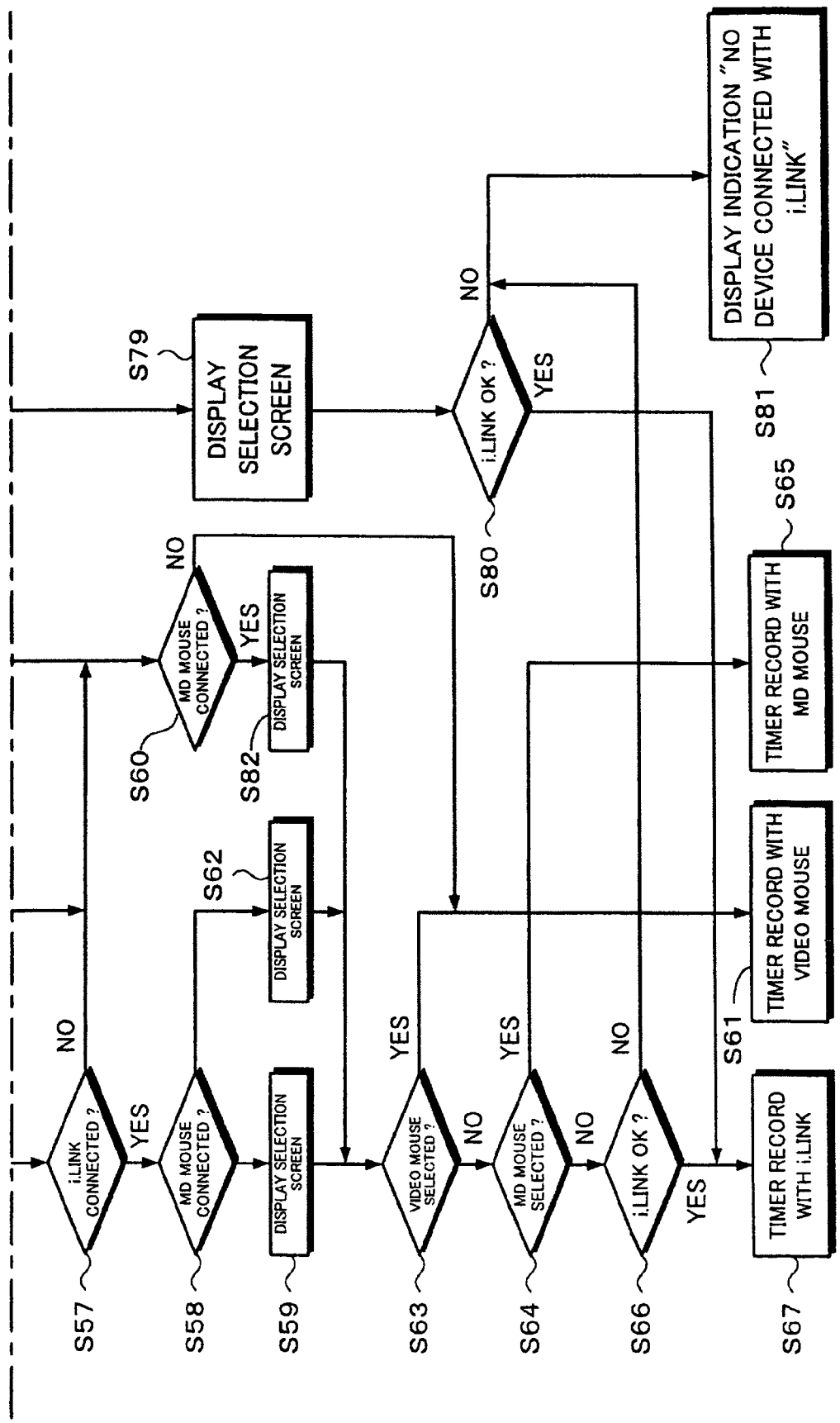
Figure 12A:
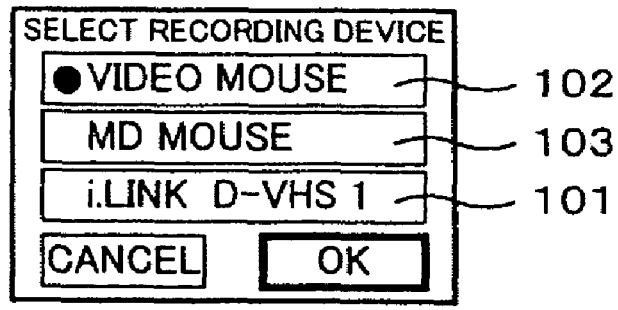
FIGS. 12A, 12B, 12C, and 12D are schematic diagrams for explaining the timer record operation of the digital satellite broadcast receiving system according to the present invention.
Figure 12B:
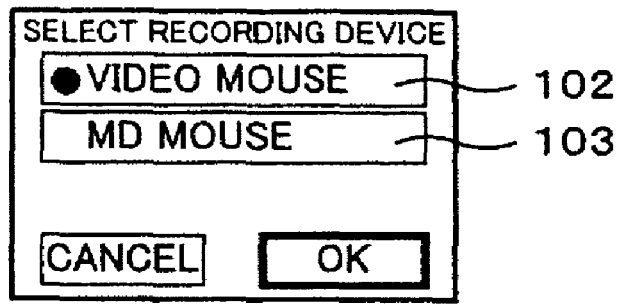
Figure 12C:
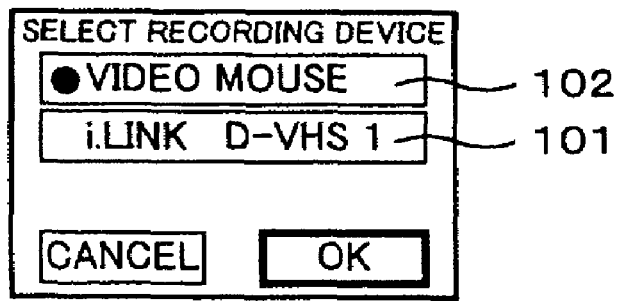

When a record button 92 is pressed (at step S56), it is determined whether or not there is a device connected with the IEEE 1394 interface (at step S57) (in FIG. 10B, i-LINK means the IEEE 1394 interface). When the determined result at step S57 is Yes (namely, there is a device connected with the IEEE 1394 interface), it is determined whether or not the MD mouse is connected (at step S58). When the determined result at step S58 is Yes (namely, the MD mouse is connected), as shown in FIG. 12A, a screen for selecting one of the video mouse, the MD mouse, and the IEEE 1394 interface is displayed (at step S59). When the determined result at, step S58 is No (namely, the MD mouse is not connected), as shown in FIG. 12C, a screen for selecting one of the video mouse and the IEEE 1394 interface is displayed (at step S62).

When the determined result at step S57 is No (namely, there is no device that is connected with the IEEE 1394 interface), it is determined whether or not the MD mouse is connected (at step S60). When the determined result at step S60 is No (namely, the MD mouse is not connected), the analog video timer record process is performed with the video mouse (at step S61). When the determined result at step S60 is Yes (namely, the MD mouse is connected), as shown in FIG. 12B, a screen for selecting one of the video mouse and the MD mouse is displayed (at step S82).

With the selecting screen at step S59 (shown in FIG. 12A), the user selects one of the IEEE 1394 interface (indication 101), the video mouse (indication 102), and the MD mouse (indication 103). With the selecting screen at step S62 (shown in FIG. 12C), the user selects one of the video mouse (indication 102) and the IEEE 1394 interface (indication 101). With the selecting screen at step S82 (shown in FIG. 12B), the user selects one of the video mouse (indication 102) and the MD mouse (indication 103).

Thereafter, it is determined whether or not the video mouse has been selected (at step S63). When the determined result at step S63 is Yes (namely, the video mouse has been selected), the flow advances to step S61. At step S61, the analog video timer record process is performed with the video mouse.

When the determined result at step S63 is No (namely, the video mouse has not been selected), it is determined whether or not the MD mouse has been selected (at step S64). When the determined result at step S64 is Yes (namely, the MD mouse has been selected), the timer record process is performed with the MD mouse (at step 65).

When the determined result at step S64 is No (namely, the MD mouse has not been selected), it is determined whether or not there is a device connected with the IEEE 1394 interface (at step S66). When the determined result at step S66 is Yes (namely, there is a device connected with the IEEE 1394 interface), the digital timer record process is performed with the IEEE 1394 interface (at step S67). When the determined result at step S66 is No (namely, there is no device connected with the IEEE 1394 interface), an indication "There is no device connected with the IEEE 1394 interface." is displayed (at step S81).

Corresponding to the Descriptor

"DM_copy_control_descriptor", when the analog copy operation is not prohibited as the determined result at step S51 and the CGMS is "O1" or "11" as the determined result at step S52, although the analog record operation is permitted, the digital record operation is prohibited. In this case, as shown in FIG. 11B, a program play/record setup screen is displayed (at step S68). The screen shown in FIG. 11B contains an alarm indication "This program cannot be copied with the IEEE 1394 interface" 93B.

When the play button 91 is pressed (at step S69), the play process for the designated program is performed (at step S55). When the record button 92 is pressed (at step S70), the flow advances to step S60. At step S60, it is determined whether or not the MD mouse is connected. When the determined result at step S60 is No (namely, the MD mouse is not connected), the analog video timer record process is performed with the video mouse at step S61. When the determined result at step S60 is Yes (namely, the MD mouse is connected), as shown in FIG. 12B, the screen for selecting one of the video mouse and the MD mouse is displayed (at step S82).

Thereafter, it is determined whether or not the video mouse has been selected (at step S63). When the determined result at step S63 is Yes (namely, the video mouse has been selected), the analog video timer record process is performed with the video mouse (at step S61). When the determined result at step S63 is No (namely, the video mouse has not been selected), it is determined whether or not the MD mouse has been selected (at step S64). When the determined result at step S64 is Yes (namely, the MD mouse has been selected), the timer record process is performed with the MD mouse (at step S65).

When the analog copy operation is prohibited as the determined result at step S51, it is determined whether or not the designated program is a pay-per-tape program that is recorded with a payment of a predetermined fee (at step S71). At this point, assuming that the CGMS is "11", the digital copy operation is prohibited. The analog copy operation is permitted with a payment of a predetermined fee. As shown in FIG. 11C, a program play/record setup screen is displayed (at step S72). The screen shown in FIG. 11C contains a symbol that represents "additional fee is required" and an alarm indication "The program cannot be copied with the IEEE 1394 interface" 93C.

When the play button 91 is pressed (at step S73), the play process for the designated program is performed (at step S55). When the record button 92 is pressed (at step S74), the flow advances to step S60. At step S60, it is determined whether or not the MD mouse is connected. When the determined result at step S60 is No (namely, the MD mouse is not connected), the analog video timer record process is performed with the video mouse at step S61. When the determined result at step S60 is Yes (namely, the MD mouse is connected), as shown in FIG. 12B, the screen for selecting one of the video mouse and the MD mouse is displayed (at step S62).

Thereafter, it is determined whether or not the video mouse has been selected (at step S63). When the determined result at step S63 is Yes (namely, the video mouse has been selected), the analog video timer record process is performed with the video mouse (at step S61). When the determined result at step S63 is No (namely, the video mouse has not been selected), it is determined whether or not the MD mouse has been selected (at step S64). When the determined result at step S64 is Yes (namely, the MD mouse has been selected), the audio timer record process is performed with the MD mouse (at step S65).

When the analog copy operation is prohibited as the determined result at step S51 and the program is not a pay tape program as the determined result at step S71, it is determined whether the CGMS is "10", "00", "01", or "11" (at step S75).

When the CGMS is "10" or "00", the digital copy operation is permitted. In other words, at this point, although the analog copy operation is prohibited, the digital copy operation is permitted. As shown in FIG. 11D, a program play/record setup screen is displayed (at step S76). The screen shown in FIG. 11D contains an alarm indication "The program cannot be recorded with the video mouse." 93D.

Figure 12D:
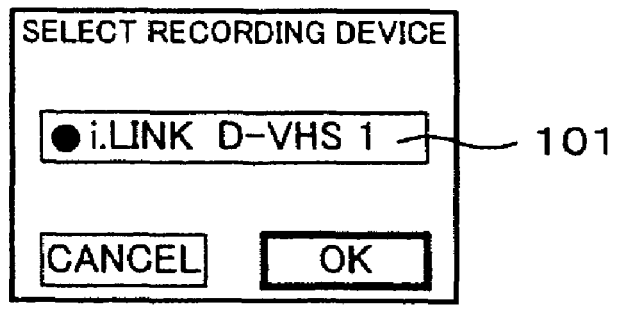

When the play button 91 is pressed (at step S77), the play process for the designated program is performed (at step S55). When the record button 92 is pressed, as shown in FIG. 12D, an IEEE 1394 device selecting screen is displayed (at step S79). Thereafter, it is determined whether or not there is a device connected with the IEEE 1394 interface (at step S80). When the determined result at step S80 is Yes (namely, there is a device connected with the IEEE 1394 interface), the flow advances to step S67. At step S67, the timer record process is performed with the IEEE 1394 interface. When the determined result at step S80 is No (namely, there is no device connected with the IEEE 1394 interface), an indication "There is no device connected with the IEEE 1394 interface" is displayed (at step S81).

When the analog copy operation is prohibited as the determined result at step S51, the program is not a pay-tape program as the determined result at step S71, and the CGMS is "O1" or "11" as the determined result at step S75, both the analog copy operation and the digital copy operation are prohibited. At this point, as shown in FIG. 11E, an alarm indication "The program cannot be recorded" 93E is displayed (at step S83). When the play button 91 is pressed (at step S84), the play process for the designated program is performed (at step S55).

In the above-described example, when the timer record operation is performed, corresponding to information of (DM_copy_control_descriptor) and information of CGMS or MCGMS, it is determined whether the analog copy operation and the digital copy operation are prohibited or permitted. When the analog copy operation is prohibited, the analog timer record process is prohibited from being selected with the video mouse and the MD mouse. When the digital copy operation is prohibited, the digital timer record process is prohibited from being selected with the IEEE 1394 interface.

Thus, a program can be prevented from being illegally copied so as to protect the copyright thereof.

Figure 13B:
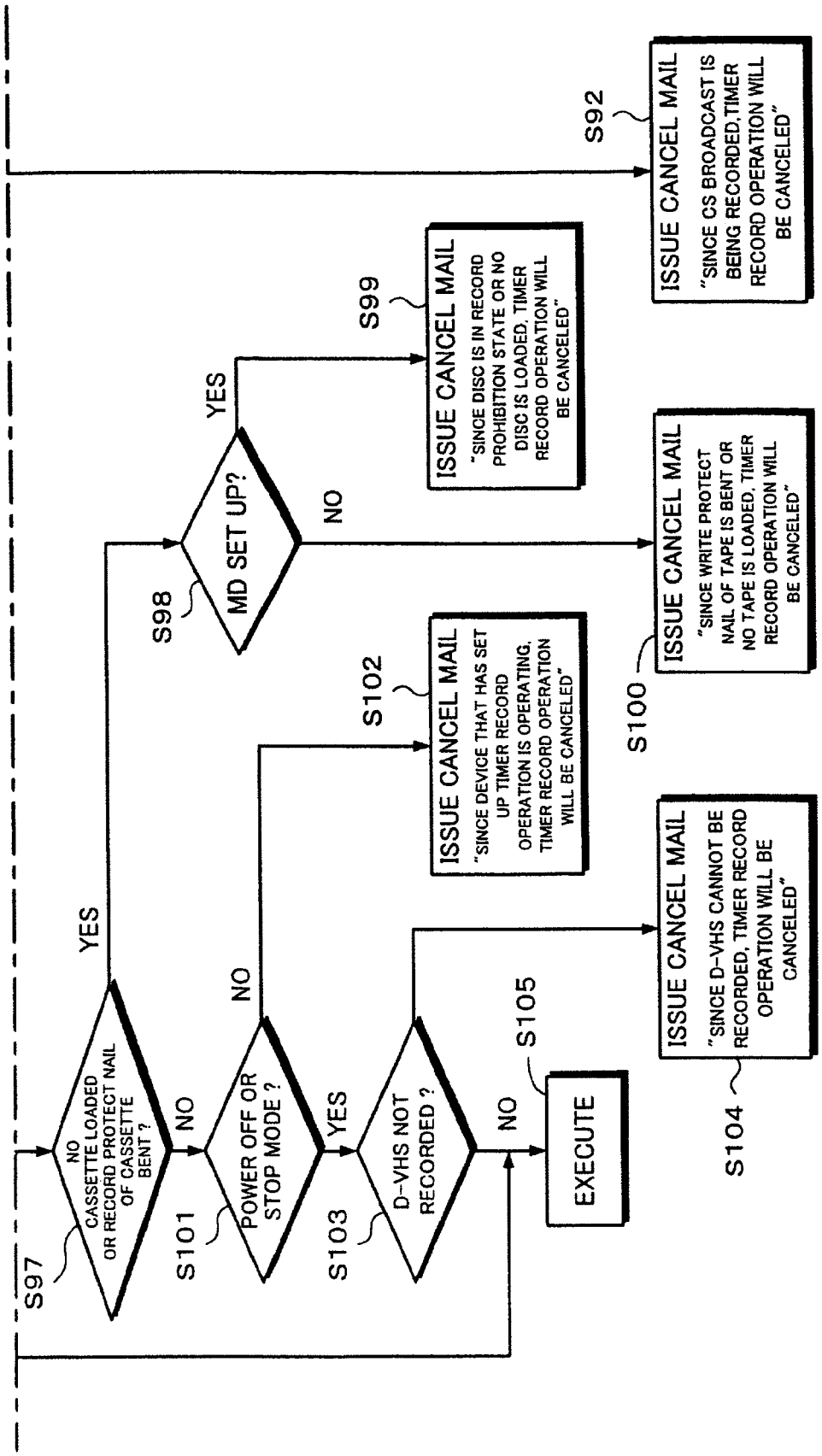

When the timer record operation is executed, a process as shown in FIG. 13 is performed. In this process, it is determined whether or not the timer record operation can be performed. When the timer record operation cannot be performed, a relevant message is displayed.

When the timer record operation is executed, it is determined whether or not a digital satellite broadcast program is being recorded (at step S91). When the determined result at step S91 is Yes (namely, a digital satellite broadcast program is being recorded), a cancel mail "since a digital satellite broadcast program is being recorded, a program cannot be set up for the timer record operation" is issued (at step S92).

When the determined result at step S91 is No (namely, a digital satellite broadcast program is not being recorded), it is determined whether or not the MD synchronous record operation is being performed (at step S93). When the determined result at step S93 is Yes (namely, the MD synchronous record operation is being performed), the flow advances to step S92. At step S92, a cancel mail "since a digital satellite broadcast program is being recorded, the timer record operation will be canceled" is issued.

When the determined result at step S93 is No (namely, the MD synchronous record operation is not being performed), a device connected with the IEEE 1394 interface other than a device that has set up the timer record operation is disconnected (at step S94). The reason why a device connected with the IEEE 1394 other than a device that has set up the timer record operation is disconnected is to prevent the IRD 1 from malfunctioning.

Thereafter, it is determined whether or not the timer record operation has been set up with the IEEE 1394 interface (at step S95). When the determined result at step S95 is Yes (namely, the timer record operation has been set up with the IEEE 1394 interface), the IRD 1 is connected to the device that has set up the timer record operation with the IEEE 1394 interface (at step S96).

When the IRD 1 is connected to the device that has set up the timer record operation, the state of the device is transmitted to the IRD 1 through the IEEE 1394 interface. Thereafter, it is determined whether or not the device is in a record prohibition state (for example, a cassette is not loaded to the device or the write protect nail of the cassette is bent) (at step S97). When the determined result at step S97 is Yes, (namely, the device is in the record prohibition state), it is determined whether or not an MD recording/reproducing device has set up the timer record operation (at step S98). When the determined result at step S98 is Yes (namely, an MD recording/reproducing device has set up the timer record operation), a cancel mail "The timer record operation will be canceled because a disc is in write protect state or no disc is loaded" is issued (at step S99). When the determined result at step S98 is No (namely, an MD recording/reproducing device has not set up the timer record operation), since a digital video tape recording/reproducing device has set up the timer record operation, a cancel mail "The timer record operation will be canceled because the write protect nail of the tape is bent or no tape is loaded" (at step S100).

When the determined result at step S97 is No (namely, the device that has set up the timer record operation is not in the record prohibition state), it is determined whether or not the device stops because the power is turned off or the device is in the stop mode (at step S101). When the determined result at step S101 is No (namely, the device is neither turned off, nor in stop mode), since the device is in playback mode, fast forward mode, or rewind mode, a cancel mail "since the device is operating, the timer record operation will be canceled" is issued (at step S102).

When the determined result at step S101 is Yes (namely, the device is turned off or in stop mode), it is determined whether or not the digital record operation is disabled because an analog tape is loaded to a digital video tape recording/reproducing device or a smart file is a record prohibition portion (at step S103). When the determined result at step S103 is Yes (namely, the digital record operation is disabled), a cancel mail "since the digital video tape recording/reproducing device is not in recordable state, the timer record operation will be canceled" is issued (at step S104). When the determined result at step S103 is No (namely, the device is in a recordable state), the designated program is recorded (at step S105).

As was described above, after the timer record operation that has been set up for a device is confirmed, the state thereof is transmitted through the IEEE 1394 interface. Thus, when another device is recording a program, the MD synchronous record operation is being performed, a recording device that has set up the timer record operation is operating, neither tape nor disc is loaded to a device, or a tape or a disc is in write protect state, a device is in analog record mode, or a smart file is a write prohibition portion, a relevant indication is displayed. In addition, the timer record operation is canceled. Although the above-mentioned mails are transmitted form the broadcast station to the user, when the timer record operation cannot be performed, the IRD 1 generates such cancel mails and transmit them to the user.

According to the present invention, when the timer record operation is performed, corresponding to information of (DM copy control description) and information of CGMS or M-CGMS, it is determined whether the analog copy operation and the digital copy operation are prohibited or permitted. When the analog copy operation is prohibited, the analog timer record process is prohibited from being selected with the video mouse. When the digital copy operation is prohibited, the digital timer record process is prohibited from being performed with the IEEE 1394 interface. Thus, a program can be prevented from being illegally copied so as to protect the copyright thereof.

In addition, according to the present invention, when the timer record operation is executed, after the timer record operation is confirmed, the state of the device that has set up the timer record operation is transmitted to the IRD 1 through the IEEE 1394 interface. Thus, while another device is recording a program, the MD synchronous record operation is being performed, a device that has set up the timer record operation is operating, a tape or a disc is not loaded to a device or in write protect state, a device is in analog record mode, or a smart file is a record prohibition portion, a relevant indication is displayed. In addition, the timer record operation is canceled.

As was described above, the present invention can be suitably applied to a digital broadcast receiving system that receives a broadcast signal of an MPEG2 transport stream of video data and audio data and transfers the transport stream to a digital signal processing device through an IEEE 1394 interface. The present invention can be also suitably applied to a receiving device used in such a system.

The invention claimed is:
1. A digital receiving system, comprising:
a digital receiving device for receiving a digital transmission transmitted with a transport stream of which video data and audio data are compressed and decoding the received signal of the digital transmission; and a plurality of digital signal processing devices for processing a digital signal;

wherein said digital receiving device and said plurality of digital signal processing devices are connected through an interface and a digital signal is exchanged between said digital receiving device and said plurality of digital signal processing devices; and wherein said digital receiving device comprises:

a timer record operation setup device for setting up a timer record operation for a desired program;

a copy prohibition determining device for determining whether or not a program to which the timer record operation has been set up is prohibited from being digitally copied;

a display for displaying an indication that represents that a program that has been set up for the timer record operation cannot be digitally copied when the program is prohibited from being digitally copied; and a registration state determination device, wherein the timer record operation is set up only if the registration state of a selected one of the plurality of digital signal processing devices indicates that the selected device is registered with the digital receiving device.

2. The digital receiving system as set forth in claim 1, further comprising:

an analog signal processing device for exchanging an analog signal with said digital receiving device;

wherein said digital receiving device further comprises:

an analog copy prohibition determination device for determining whether or not a program to which the timer record operation has been set up is prohibited from being analogously copied, and wherein when the program to which the timer record operation has been set up is prohibited from being analogously copied, the display displays an indication that represents that said analog signal processing device cannot copy the program to which the timer record operation has been set up.

3. A digital receiving system, comprising:

a digital receiving device for receiving a digital broadcast transmitted with a transport stream of which video data and audio data are compressed and decoding the received signal of the digital broadcast; and a plurality of digital signal processing devices for processing a digital signal;

wherein said digital receiving device and said plurality of digital signal processing devices are connected through an interface and a digital signal is exchanged between said digital broadcast receiving device and said plurality of digital signal processing devices; and wherein said digital receiving device comprises:

a timer record operation setup device for setting up a timer record operation for a desired program; and a timer record operation execution controlling device for determining whether or not the program can be recorded and for canceling the timer record operation and issuing a message that represents that the timer record operation cannot be performed when the program cannot be recorded as the determined result, wherein said timer record operation execution controlling device detects registration states of said plurality of digital signal processing devices corresponding to data transmitted through the interface so as to determine whether or not the timer record operation can be executed.

4. The digital receiving system as set forth in claim 3, wherein said timer record operation execution controlling device determines that the timer record operation cannot be executed when one of said plurality of digital signal processing devices that executes the timer record operation is operating.

5. The digital receiving system as set forth in claim 3, wherein when a recording medium loaded to a selected device that is one of said plurality of digital signal processing devices and that executes the timer record operation is in a record prohibition state, said timer record operation execution controlling device determines that the selected device cannot execute the timer record operation.

6. The digital receiving system as set forth in claim 3, wherein when a synchronous record operation is performed between two of said plurality of digital signal processing devices, said timer record operation execution controlling device determines that the timer record operation cannot be performed.

7. The digital receiving system as set forth in claim 3, wherein while an output signal of said digital receiving device is being recorded, said timer record operation execution controlling device determines that the timer record operation cannot be executed.

8. A digital receiving device for receiving a digital broadcast transmitted with a transport stream of which video data and audio data are compressed and decoding the received signal of the digital broadcast, comprising:

an interface for exchanging data with a plurality of digital signal processing devices for processing a digital signal;

a timer record operation setup device for setting up a timer record operation for a desired program;

a copy prohibition determining device for determining whether or not a program to which the timer record operation has been set up is prohibited from being digitally copied;

a display for displaying an indication that represents that a program that has been set up for the timer record operation cannot be digitally copied when the program is prohibited from being digitally copied; and a registration state determination device, wherein the timer record operation is set up only if the registration state of a selected one of the plurality of digital signal processing devices indicates that the selected device is registered with the digital receiving device.

9. The digital receiving device as set forth in claim 8, further comprising:

an analog copy prohibition determining device for determining whether or not a program to which the timer record operation has been set up is prohibited from being analogously copied;

wherein when the program to which the timer record operation has been set up is prohibited from being analogously copied, said display displays an indication that represents that the program to which the timer record operation has been set up cannot be copied.

10. A digital receiving device for receiving a digital broadcast transmitted with a transport stream of which video data and audio data are compressed and decoding the received signal of the digital broadcast, comprising:

an interface for exchanging data with a plurality of digital signal processing devices for processing a digital signal;

a timer record operation setup device for setting up a timer record operation for a desired program;

a copy prohibition determining device for determining whether or not a program to which the timer record operation has been set up is prohibited from being digitally copied;

a timer record operation execution controlling device for determining whether or not the program can be recorded and for canceling the timer record operation and issuing a message that represents that the timer record operation cannot be performed when the program cannot be recorded as the determined result;

wherein said timer record operation execution controlling device detects registration states of said plurality of digital signal processing devices corresponding to data transmitted through the interface so as to determine whether or not the timer record operation can be executed.

11. The digital receiving device as set forth in claim 10, wherein said timer record operation execution controlling device determines that the timer record operation cannot be executed when one of said plurality of digital signal processing devices that executes the timer record operation is operating.

12. The digital receiving device as set forth in claim 10, wherein when a recording medium loaded to a selected device that is one of said plurality of digital signal processing devices and that executes the timer record operation is in a record prohibition state, said timer record operation execution controlling device determines that the selected device cannot execute the timer record operation.

13. The digital receiving device as set forth in claim 10, wherein when a synchronous record operation is performed between two of said plurality of digital signal processing devices, said timer record operation execution controlling device determines that the timer record operation cannot be performed.

14. The digital receiving data as set forth in claim 10, wherein while an output signal of said digital receiving device is being recorded, said timer record operation execution controlling device determines that the timer record operation cannot be executed.

* * * * *

UNITED STATES PATENT AND TRADEMARK OFFICE
CERTIFICATE OF CORRECTION

| | | |
|---|---|---|
| PATENT NO. | : 7,715,689 B2 | Page 1 of 1 |
| APPLICATION NO. | : 11/371275 | |
| DATED | : May 11, 2010 | |
| INVENTOR(S) | : Wakahara et al. | |

It is certified that error appears in the above-identified patent and that said Letters Patent is hereby corrected as shown below:

On the Title Page of the patent Item (*), please add reference to the Terminal Disclaimer filed.

Signed and Sealed this
Third Day of May, 2011

David J. Kappos
*Director of the United States Patent and Trademark Office*